(12) United States Patent
Aumont et al.

(10) Patent No.: US 7,237,387 B2
(45) Date of Patent: Jul. 3, 2007

(54) MOUNTING A HIGH PRESSURE TURBINE NOZZLE IN LEAKTIGHT MANNER TO ONE END OF A COMBUSTION CHAMBER IN A GAS TURBINE

(75) Inventors: Caroline Aumont, Paris (FR); Eric Conete, Merignac (FR); Mario De Sousa, Cesson la Foret (FR); Didier Hernandez, Quiers (FR)

(73) Assignee: Snecma, Paris (FR)

( * ) Notice: Subject to any disclaimer, the term of this patent is extended or adjusted under 35 U.S.C. 154(b) by 204 days.

(21) Appl. No.: 11/153,354

(22) Filed: Jun. 16, 2005

(65) Prior Publication Data

US 2006/0032236 A1 Feb. 16, 2006

(30) Foreign Application Priority Data

Jun. 17, 2004 (FR) .................................. 04 06594

(51) Int. Cl.
F23R 3/42 (2006.01)
(52) U.S. Cl. ............................ 60/796; 60/752; 415/191
(58) Field of Classification Search .................. 60/752, 60/753, 796, 798, 800; 415/191
See application file for complete search history.

(56) References Cited

U.S. PATENT DOCUMENTS 2,622,790 A 12/1952 McLeod et al.
2,765,620 A * 10/1956 Egbert .......................... 60/752
3,018,624 A * 1/1962 Bonsall et al. ................. 60/796
6,000,906 A 12/1999 Draskovich
6,679,062 B2 1/2004 Conete et al.
6,823,676 B2 11/2004 Conete et al.
2002/0184891 A1* 12/2002 Conete et al. ................. 60/796
2003/0000223 A1* 1/2003 Conete et al. ................. 60/796

FOREIGN PATENT DOCUMENTS

DE 949 824 C 9/1956
FR 942 230 A 2/1949
FR 2 825 780 A1 12/2002
FR 2 825 787 A1 12/2002

* cited by examiner

Primary Examiner—L. J. Casaregola
(74) Attorney, Agent, or Firm—Rothwell, Figg, Ernst & Manbeck, PC

(57) ABSTRACT

The downstream end portions of the inner and outer walls of the combustion chamber of the gas turbine are pressed against the inner and outer platforms respectively of the vanes of the high pressure turbine nozzle and they extend thereover substantially to the downstream end of the platforms, and the means for mechanically connecting the turbine nozzle to the downstream end portions of the combustion chamber walls are formed by connection screws implanted in the airfoils of the vanes of the turbine nozzle, passing through holes formed in the end portions of the combustion chamber walls. Thus, the downstream end portions of the combustion chamber walls contribute to preventing leakage from the gas stream at the interface between the chamber and the nozzle, and also along the nozzle.

10 Claims, 4 Drawing Sheets

MOUNTING A HIGH PRESSURE TURBINE NOZZLE IN LEAKTIGHT MANNER TO ONE END OF A COMBUSTION CHAMBER IN A GAS TURBINE

BACKGROUND OF THE INVENTION

The invention relates to gas turbines, in particular for airplane engines or industrial turbines. The invention relates more particularly to leaktight mounting of a high pressure (HP) turbine nozzle to the downstream end of a combustion chamber.

In a gas turbine having an annular combustion chamber, proposals have already been made to mount the high pressure turbine nozzle by connecting it mechanically to a downstream end portion of the combustion chamber (throughout this application, the terms "upstream" and "downstream" are used relative to the flow direction of the combustion gas produced in the chamber). The assembly formed by the combustion chamber and the HP turbine nozzle can then be supported by connection ferrules connected to inner and outer metal shrouds.

Such a disposition serves to provide better continuity for the gas stream at the interface between the combustion chamber and the turbine nozzle, thus making it easier to provide sealing at said interface, in comparison with a disposition in which the combustion chamber and the HP turbine nozzle are separately connected to the inner and outer metal shrouds.

A combustion chamber with a turbine nozzle integrated in its downstream end portion is shown in document FR 2 825 787. The combustion chamber is made of ceramic matrix composite (CMC) material and the assembly comprising the combustion chamber and the HP turbine nozzle is held between the inner and outer metal shrouds by means of flexible metal connection ferrules that are in the form of sectors so as to make it possible to accommodate the differences between the coefficients of thermal expansion of the metal and of the ceramic composite material.

The turbine nozzle comprises a plurality of stationary vanes secured to internal and external platforms in the form of juxtaposed ring sectors having inside faces defining a flow path through the turbine nozzle for a gas stream coming from the combustion chamber. The mechanical connection between the nozzle and the combustion chamber is provided by means of nuts and threaded rods that are secured to the platforms of the nozzle vanes and that engage in notches formed in the downstream end portions of the inner and outer walls of the combustion chamber.

Sealing can thus be provided at the interface between the combustion chamber and the turbine nozzle. Nevertheless, it remains necessary to seal the stream in the turbine nozzle at the interfaces between the vane platforms.

OBJECT AND BRIEF SUMMARY OF THE INVENTION

An object of the invention is to achieve optimized mounting of an HP turbine nozzle to the end of a combustion chamber, making it simple to solve the problem of preventing leaks from the gas stream, not only at the interface between the combustion chamber and the turbine nozzle, but also along the nozzle.

This object is achieved by a gas turbine comprising:

an annular combustion chamber having an inner wall and an outer wall;

a high pressure turbine nozzle having a plurality of stationary vanes distributed around an axis that coincides with the axis of the combustion chamber, the vanes having airfoils secured to inner and outer platforms in the form of juxtaposed ring sectors with inside faces defining between them a flow path through the turbine nozzle for the gas stream coming from the combustion chamber; and connection means for mechanically connecting the turbine nozzle to downstream end portions of the inner and outer walls of the combustion chamber;

in which gas turbine, according to the invention:

the downstream end portions of the inner and outer walls of the combustion chamber are pressed against the inner and outer platforms respectively of the vanes of the turbine nozzle substantially all the way to the downstream ends of the platforms; and the connection means are formed by substantially radial connection screws implanted in vane airfoils of the turbine nozzle, passing through holes formed in the end portions of the inner and outer walls of the combustion chamber.

Thus, sealing is provided between the inner platforms and between the outer platforms of the turbine nozzle by the end portions of the inner and outer walls of the combustion chamber, these end portions being provided with holes for passing connecting screws in register with the airfoils of the nozzle, and possibly for passing cooling air towards the high pressure nozzle, but otherwise presenting circumferential continuity.

Advantageously, the assembly constituted by the combustion chamber and the turbine nozzle is held between inner and outer metal shrouds by means of respective inner and outer ferrules, and the inner and outer ferrules have end portions connected to the assembly formed by the combustion chamber and the turbine nozzle by means of said connection screws.

Preferably, the downstream end portion of the inner wall of the combustion chamber is clamped between the inner platforms of the vanes and an inner ring pressing against the outside face of the end portion of the inner wall of the combustion chamber, said end portion of the inner ferrule then possibly coming to press against an outside face of the inner ring. Advantageously, the inner ring is secured to an annular radial flange that co-operates with an annular radial flange of the inner metal shroud to hold between them an annular sealing gasket closing the space extending between the inner wall of the combustion chamber and the inner metal shroud in the vicinity of the downstream end of the turbine nozzle.

Also preferably, and in similar manner, the downstream end portion of the outer wall of the combustion chamber is clamped between the outer platforms of the vanes and an outer ring pressing against the outside face of the downstream end portion of the outer wall of the combustion chamber, said end portion of the outer ferrule then possibly coming to press against an outside face of the outer ring. Advantageously, the outer ring is secured to an annular radial flange which co-operates with an annular radial flange integral with the outer metal shroud to hold between them an annular sealing gasket closing the space extending between the outer wall of the combustion chamber and the outer metal shroud in the vicinity of the downstream end of the turbine nozzle.

According to another feature of the invention, locking means are also provided to prevent the turbine nozzle from turning so as to avoid turning forces induced by the interaction between the stationary vanes of the turbine nozzle and the gas stream coming from the combustion chamber being transmitted to the inner and outer ferrules.

Advantageously, the locking means comprise elements providing mutual locking in turning acting on at least one of the pairs of radial flanges between which an annular sealing gasket is held.

BRIEF DESCRIPTION OF THE DRAWINGS

The invention will be better understood on reading the following description given by way of non-limiting indication and with reference to the accompanying drawings, in which.

DETAILED DESCRIPTION OF EMBODIMENTS

Figure 1:
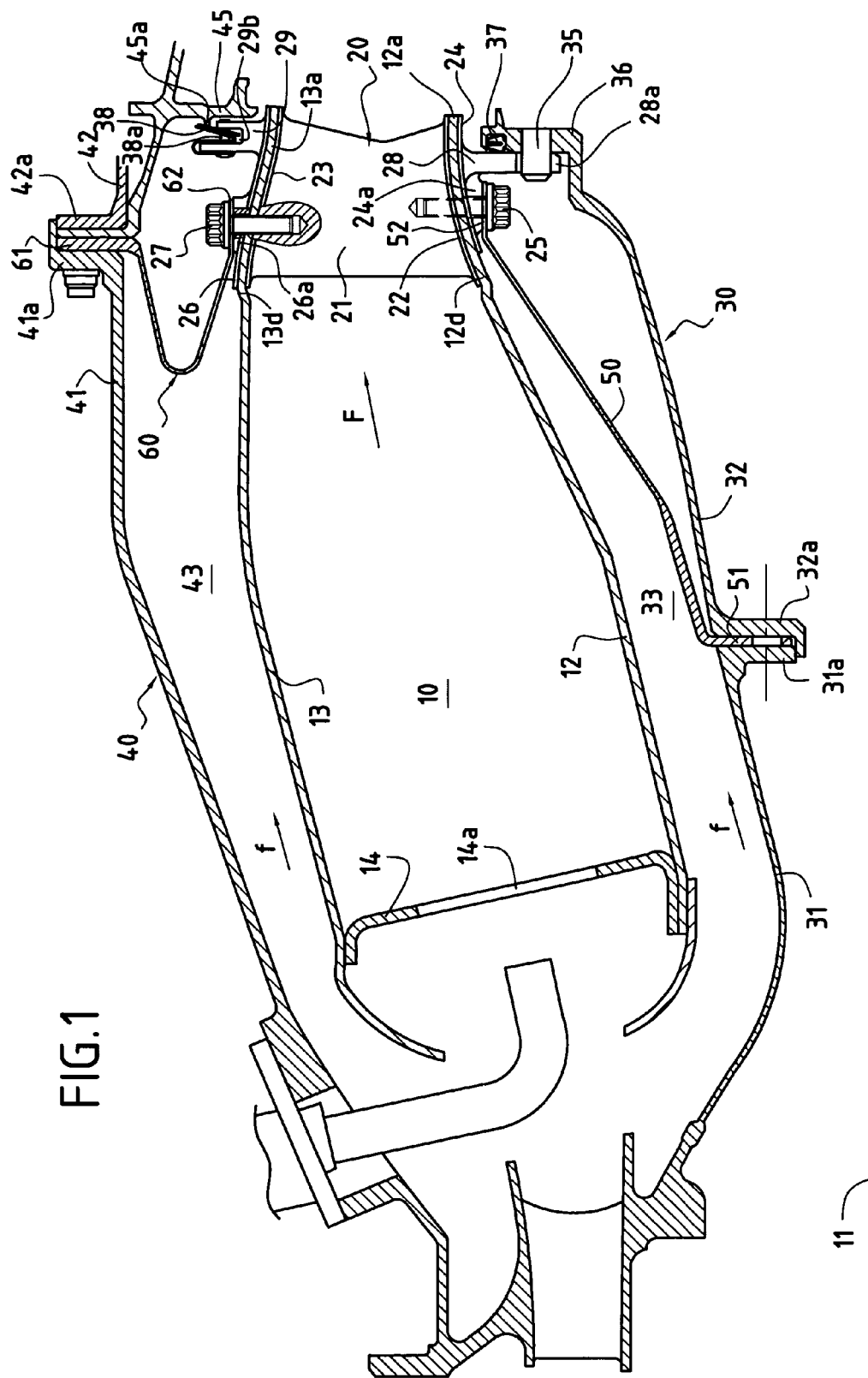
FIG. 1 is a diagrammatic axial half-section showing a portion of a gas turbine.

FIG. 1 is an axial half-section showing a portion of a gas turbine comprising an annular combustion chamber 10, a high pressure turbine nozzle 20 mechanically connected to a downstream end portion of the chamber 10, inner and outer annular metal shrouds 30 and 40, and connection ferrules 50 and 60 holding the assembly formed by the chamber 10 and the nozzle 20 in the space defined between the shrouds 30 and 40.

The combustion chamber 10 is defined by an internal annular wall 12 and an external annular wall 13 sharing the same axis 11, together with an upstream end wall 14 secured to the walls 12 and 13. In conventional manner, the end wall 14 presents a series of orifices 14a distributed around the axis 11 to receive injectors that enable fuel and oxidizer to be injected into the chamber.

Figure 2:
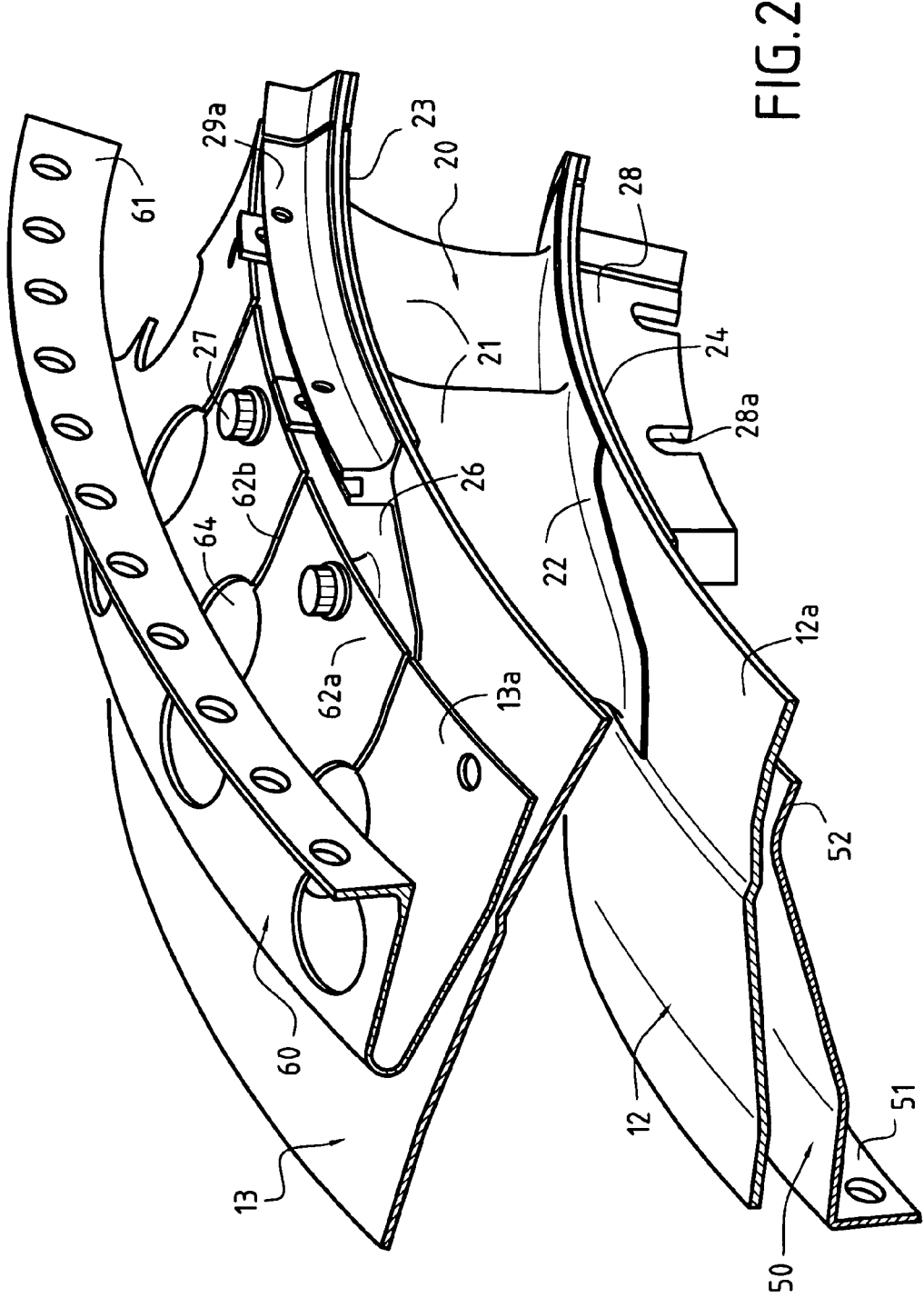
FIGS. 2 and 3 are fragmentary perspective views showing how the downstream end portion of the combustion chamber is assembled with the HP turbine nozzle, and showing the connection ferrules as used in the FIG. 1 gas turbine.
Figure 3:
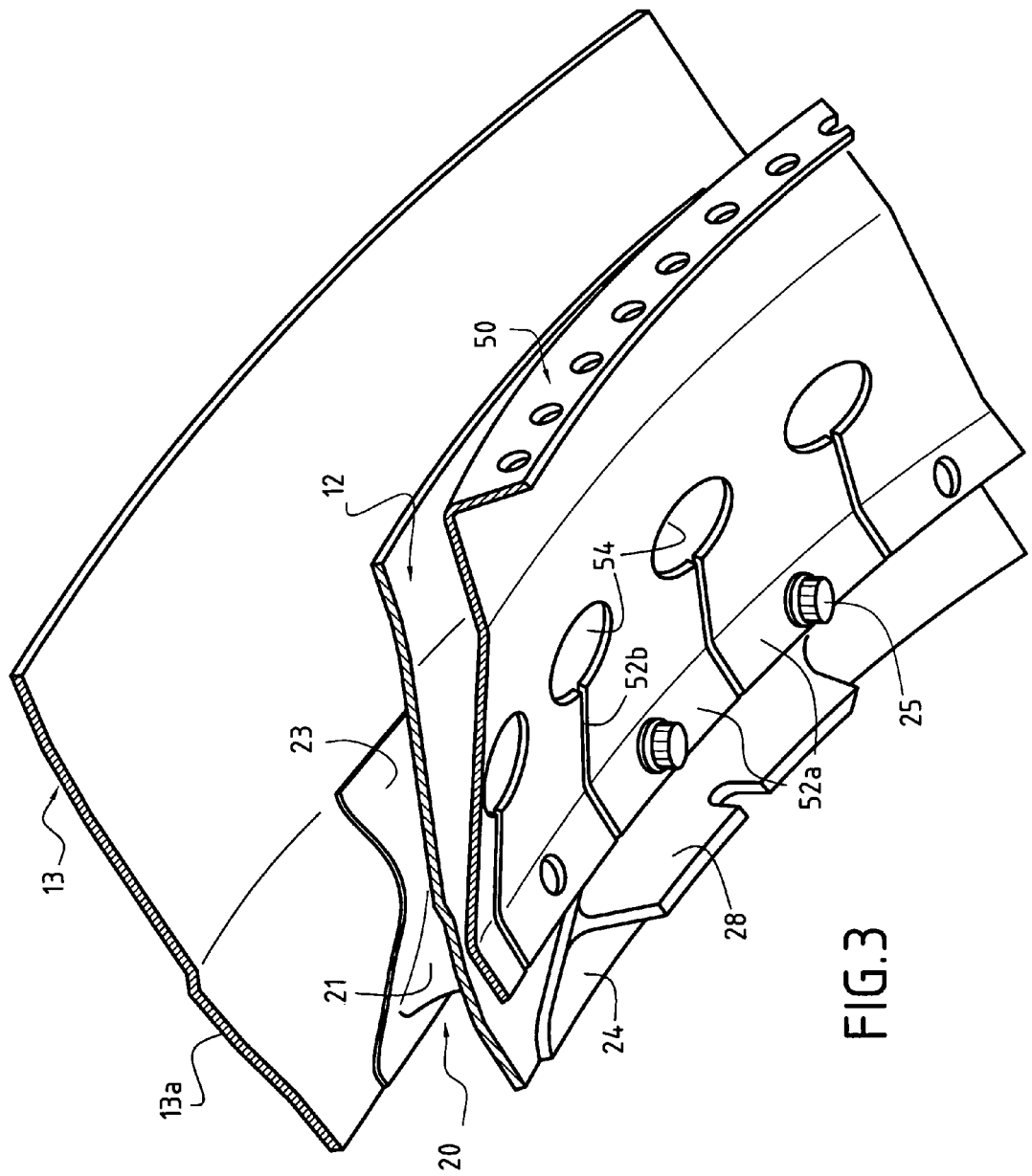

The HP turbine nozzle 20, which constitutes the inlet portion of the turbine, comprises a plurality of stationary vanes distributed angularly around the axis 11. As shown in FIGS. 2 and 3, the vanes comprise airfoils 21 secured at their ends to inner and outer platforms 22 and 23 in the form of juxtaposed ring sectors. The inside faces of the platforms 22 and 23 define the path for the gas stream flowing through the nozzle. Each inner and outer platform pair may be associated with one or more airfoils.

The inner metal shroud 30 comprises two portions 31 and 32 united by bolting through respective inwardly-directed flanges 31a and 32a. Similarly, the outer metal shroud 40 is made up of two portions 41 and 42 united by bolting through respective outwardly-directed flanges 41a and 42a. The spaces 33 and 43, respectively between the inner wall 12 of the chamber 10 and the inner shroud 30, and between the outer wall 13 of the chamber 10 and the outer shroud 40, both convey a flow of secondary cooling air (arrows f) flowing around the chamber 10.

In the example shown, the internal connection ferrule 50 presents a first end 51 in the form of a flange which is connected to the inner shroud 30 by being clamped between the flanges 31a and 32a, and being bolted thereto. At its other end 52, the ferrule 50 is connected to the downstream end portion 12a of the inner wall 12 of the chamber 10. The portion of the ferrule 50 that extends through the space 33 is curved in shape, having a section that is substantially S-shaped so as to present the flexibility required to accommodate differential radial expansion between the chamber 10 and the shroud 30, in particular when the chamber 10 is made of CMC.

Particularly when the chamber 10 is made of CMC, the ferrule 50 is sectorized, i.e. it is subdivided into sectors in the form of a plurality of tabs 52a extending from its end 52 over a certain distance towards its other end 51. This sectorization can be implemented by slots 52b between the tabs 52a, each extending from the end 52 to a hole 54 formed through the ferrule 50, said holes being angularly distributed around the axis 11 so as to allow the flow of secondary air to pass through the space 33. The slots 52b make it possible to accommodate differential expansion in the circumferential direction.

In the example shown, the connection ferrule 60 has a first end 61 in the form of a flange that is connected to the outer shroud 40 by being clamped between the flanges 41a and 42a and being bolted thereto. At its other end 62, the ferrule 60 is connected to the downstream end portion of the outer wall 13 of the chamber 10. The portion of the ferrule that extends through the space 43 has a curved shape with a section that is substantially V-shaped so as to present the flexibility required for accommodating differential expansion between the shroud 40 and the chamber 10, in particular when the chamber is made of CMC. With a CMC chamber in particular, the ferrule 60 is also subdivided into a plurality of tabs 62a in a manner similar to the ferrule 50. Thus, slots 62b extend between the tabs 62a going from the end 62 of the ferrule over a certain distance towards the end 61, e.g. as far as holes 64 that allow the secondary air flow to pass through the space 43.

When the walls of the combustion chamber are made of a refractory metal, it can be unnecessary for the ferrules 50 and 60 to be sectorized.

Naturally, the ends 51 and 61 of the ferrules 50 and 60 could be connected to the inner and outer shrouds 30 and 40 at some location other than that of the flanges 31a, 32a, and 41a, 42a.

The inner wall 12 of the chamber 10 has its downstream end portion 12a bearing against the outside faces of the platforms 22, extending substantially to the downstream ends thereof. A sectorized inner ring 24 presses against the outside face of the end portion 12a of the inner wall of the chamber. The ring 24 is made up of juxtaposed ring sectors, optionally corresponding to the inner platforms 22. The sectors of the ring 24 present projections 24a against which the sectorized end 52 of the ferrule 50 comes to bear. Substantially radial inner connection screws 25 pass through holes formed in the tabs 52a of the ferrule 50, into the inner ring 24 via the projections 24a, and into the end portion 12a of the inner wall 12 of the chamber, and are screwed into tapped blind holes formed substantially radially in the inner platforms 22 and the vanes 21 (see the detail of FIG. 1). A connection screw 25 could be provided in register with each vane 21, or in register with only some of them.

In the same manner, the outer wall 13 of the chamber 10 has its downstream end portion 13a bearing against the outer faces of the platforms 23, extending substantially to the downstream ends thereof. A sectorized outer ring 26 bears against the outside face of the end portion 13a of the outer wall of the chamber. The ring 26 is made up of juxtaposed ring sectors optionally corresponding to the outer platforms 23. The sectors of the ring 26 present projections 26a against which the sectorized end 62 of the ferrule 60 comes to bear. Substantially radial outer connection screws 27 pass through holes formed in the tabs 62a of the ferrule 60, into the outer ring 26 via the projections 26a, and into the end portion 13a of the outer wall 13 of the combustion chamber, and are screwed into tapped bind holes formed substantially radially in the outer platforms 23 and the vanes 21 (see the detail of FIG. 1). A connection screw 27 can be provided for each vane 21, or for only some of them.

Where possible, the inner and/or outer rings 24 and 26 need not be sectorized, in which case they could be made as single pieces or as a plurality of portions welded together, preferably under circumstances in which the materials of the components have coefficients of expansion that are similar.

Thus, by presenting circumferential continuity to the downstream end of the turbine nozzle, the end portions 12a and 13a of the chamber walls provide sealing between the inner platforms 22 and between the outer platforms 23. There is then no need to install the sealing sheaths conventionally used for this purpose in order to guarantee that the gas stream flowing through the nozzle does not leak out, thereby achieving savings in weight and in assembly time.

Furthermore, clamping the end portions of the combustion chamber walls between the platforms and the rings consolidates the end of the chamber where it is connected to the turbine nozzle, which is advantageous when the chamber is made of CMC and might be somewhat brittle.

In addition, the continuity of the walls 12 and 13 of the combustion chamber 10 at the interface between the chamber and the turbine nozzle 20 makes it possible to ensure that the gas flow stream does not leak out via this interface. Furthermore, in order to ensure good continuity of the primary gas stream (arrows F), small steps 12d and 13d are provided at the connections between the end portions 12a and 13a with the remainder of the walls 12 and 13, as can be seen in FIG. 1. Thus, the stream flowing out from the chamber can connect substantially without discontinuity with the stream flowing through the nozzle.

Orifices (not shown) are formed through the platforms 22 and 23, and communicate with orifices formed in the end portions 12a and 13a of the walls of the chamber 10 and through the rings 24 and 26 so as to allow cooling air to pass from the spaces 33 and 43 into the stationary vanes 21 of the nozzle 20.

Advantageously, locking means are provided to prevent the nozzle 20 from turning, but without inducing circumferential forces or shear forces on the portions of the connecting ferrules 50 and 60 that extend through the spaces 33 and 43.

In the embodiment of FIGS. 1 to 3, the locking means are constituted by fingers 35 that are secured to the inner shroud 30 and that penetrate into radial notches 28a formed in a sectorized flange 28 secured to the sectorized ring 24. In the example shown, the fingers 35 extend axially and are distributed angularly around the axis 11, being carried by a radial flange 36 integral with the shroud 30, substantially level with the downstream end of the nozzle 20. The fingers 35 may be secured to the flange 36 as force-fits in holes formed through the flange 36, or they may be welded thereto. The sectors 28a forming the flange 28 are thus secured to the platforms 22.

It should also be observed that sealing at the downstream end of the space 33 is provided by means of an omega-type sealing gasket 37 which is held in a groove of the flange 36 and which presses against a downstream surface of the flange 28. The flanges 28 and 36 thus perform two functions, one of supporting the sealing gasket 37 and another of supporting the means for locking the nozzle against turning. The sealing gasket 37 is situated on the outside of the set of locking fingers 35.

In a variant, the axial locking fingers could be carried by the flange 28 and penetrate into housings such as blind holes formed in the flange 36.

On the outside, sealing at the downstream end of the space 43 is provided by a strip gasket 38 whose base is held in an annular housing 29b that opens radially outwards and that is formed in the tip of an annular flange 29 secured to the sectorized ring 26, and likewise constituted by juxtaposed annular sectors 29a, in the vicinity of the downstream end of the nozzle 20. The gasket 38 is held by means of pins 38a passing through the flanges on either side of the housing 29b and disposed axially. The gasket 38 bears against a continuous annular rib 45a formed on the upstream face of a radial flange 45 integral with the shroud 40 and level with the downstream end of the nozzle 20.

In operation, the forces exerted on the vanes 21 of the nozzle 20 by the flow of gas coming from the chamber 10 are taken up by the fingers 35 via the screws 25 and the rings 28, with no circumferential force being applied to the ferrules 50 and 60. The ferrules therefore do not need to be overdimensioned. It is even possible to envisage making them out of CMC when the chamber itself is made of CMC. Under such circumstances, there is no longer any need to sectorize the ferrules where they are connected to the combustion chamber, but sectorization may then be desirable where they are connected to the metal inner and outer shrouds.

The screws 25 and 27 may be made of metal, particularly when the connection ferrules are made of metal, or else they may be made of CMC.

Figure 4:
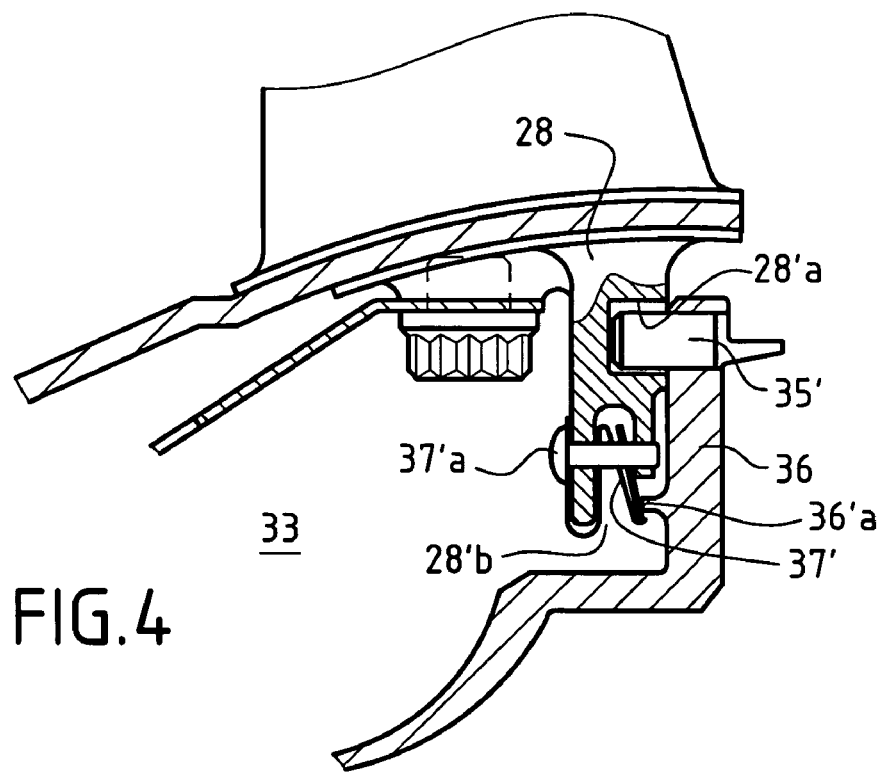
FIGS. 4 and 5 are detail views showing variant ways of preventing the HP turbine nozzle from turning.

FIG. 4 shows another embodiment which differs from that of FIGS. 1 to 3 in that the downstream end of the space 33 is sealed by means of a strip gasket 37' and the ring 24 is prevented from turning by fingers 35' situated on the outside of the gasket 37' and penetrating into oblong blind holes 28'a formed in the sectorized flange 28. At its tip, the flange has an annular housing 28'b in which the base of the strip gasket 37' is held by pins 37'a. Outside the annular housing 28'b, the strip gasket 37' bears against a continuous annular rib 36'a formed on the upstream face of the flange 36.

Figure 5:
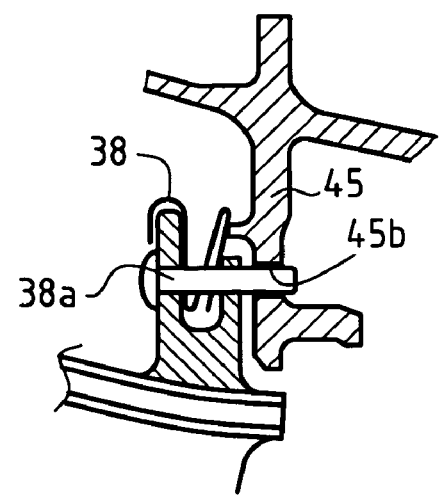

FIG. 5 shows another embodiment which differs from that of FIGS. 1 to 3 in that the nozzle 20 is prevented from turning also via the outer ring 26.

Advantageously, use is made of the pins 38a for this purpose by extending them downstream so that they penetrate into holes 45b formed in the flange 45. The pins 38a could optionally be overdimensioned, i.e. greater in diameter than would be required solely for holding the sealing gasket 38.

The embodiment of FIG. 5, in which locking is provided against turning at both the inner and the outer platforms of the nozzle is advantageous in that it enables the forces transmitted between the nozzle and the metal shrouds to be shared between the shrouds.

Naturally, in order to prevent the nozzle from turning, it would be possible to adopt an assembly at the outer platforms similar to that used in the embodiment shown in FIG. 4 for the inner platforms, i.e. locking fingers carried by the flange 45 and penetrating into blind holes in the flange 26.

What is claimed is:

1. A gas turbine comprising:
    an annular combustion chamber having an inner wall and an outer wall;
    a high pressure turbine nozzle having a plurality of stationary vanes distributed around an axis that coincides with the axis of the combustion chamber, the vanes having airfoils secured to inner and outer platforms in the form of juxtaposed ring sectors with inside faces defining between them a flow path through the turbine nozzle for the gas stream coming from the combustion chamber; and connection means for mechanically connecting the turbine nozzle to downstream end portions of the inner and outer walls of the combustion chamber;

wherein:

the downstream end portions of the inner and outer walls of the combustion chamber are pressed against the inner and outer platforms respectively of the vanes of the turbine nozzle substantially all the way to the downstream ends of the platforms; and the connection means are formed by substantially radial connection screws implanted in vane airfoils of the turbine nozzle, passing through holes formed in the end portions of the inner and outer walls of the combustion chamber.

2. A gas turbine according to claim 1, in which the assembly constituted by the combustion chamber and the turbine nozzle is held between inner and outer metal shrouds by means of respective inner and outer ferrules, wherein the inner and outer ferrules have end portions connected to the assembly formed by the combustion chamber and the turbine nozzle by means of said connection screws.

3. A gas turbine according to claim 2, wherein the downstream end portion of the inner wall of the combustion chamber is clamped between the inner platforms of the vanes and an inner ring pressing against the outside face of the end portion of the inner wall of the combustion chamber.

4. A gas turbine according to claim 3, wherein said end portion of the inner ferrule comes to press against an outside face of the inner ring.

5. A gas turbine according to claim 2, wherein the downstream end portion of the outer wall of the combustion chamber is clamped between the outer platforms of the vanes and an outer ring pressing against the outside face of the downstream end portion of the outer wall of the combustion chamber.

6. A gas turbine according to claim 5, wherein said end portion of the outer ferrule comes to press against an outside face of the outer ring.

7. A gas turbine according to claim 3, wherein the inner ring is secured to an annular radial flange that co-operates with an annular radial flange of the inner metal shroud to hold between them an annular sealing gasket closing the space extending between the inner wall of the combustion chamber and the inner metal shroud in the vicinity of the downstream end of the turbine nozzle.

8. A gas turbine according to claim 5, wherein the outer ring is secured to an annular radial flange which co-operates with an annular radial flange integral with the outer metal shroud to hold between them an annular sealing gasket closing the space extending between the outer wall of the combustion chamber and the outer metal shroud in the vicinity of the downstream end of the turbine nozzle.

9. A gas turbine according to claim 2, wherein locking means are also provided to prevent the turbine nozzle from turning so as to avoid turning forces induced by the interaction between the stationary vanes of the turbine nozzle and the gas stream coming from the combustion chamber being transmitted to the inner and outer ferrules.

10. A gas turbine according to claim 9, wherein the locking means comprise elements providing mutual locking in turning acting on at least one of the pairs of radial flanges between which an annular sealing gasket is held.

* * * * *